United States Patent [19]
Gibson

[11] Patent Number: 6,021,454
[45] Date of Patent: Feb. 1, 2000

[54] DATA TRANSFER BETWEEN SMALL COMPUTER SYSTEM INTERFACE SYSTEMS

[75] Inventor: Kenneth J. Gibson, Boulder, Colo.

[73] Assignee: Adaptec, Inc., Milpitas, Calif.

[21] Appl. No.: 09/049,522

[22] Filed: Mar. 27, 1998

[51] Int. Cl.[7] .................................................. G06F 13/00
[52] U.S. Cl. ..................... 710/129; 710/128; 709/200; 709/231
[58] Field of Search ..................... 710/129, 128, 710/5, 74, 72, 52, 62, 1, 22, 36, 56; 709/200, 213, 217, 203, 231, 229; 711/112; 714/3, 2; 379/90.01; 370/911, 912; 375/222

[56] References Cited

U.S. PATENT DOCUMENTS

| | | | |
|---|---|---|---|
| 5,257,391 | 10/1993 | DuLac et al. | 710/10 |
| 5,524,268 | 6/1996 | Geldman et al. | 710/5 |
| 5,732,223 | 3/1998 | Moore et al. | 710/52 |

*Primary Examiner*—Gopal C. Ray
*Attorney, Agent, or Firm*—Duft,Graziano&Forest,P.C.

[57] ABSTRACT

The invention improves fault tolerance by physically separating computer systems that are connected by a Small Computer System Interface (SCSI). The invention includes a data transfer system that receives the data from the computer over a first SCSI bus and then releases the first SCSI bus. The data transfer system transfers the data within the data transfer system over a non-SCSI connection, such as a Fiber Channel link. The data transfer system then transfers the data to the disk drive over a second SCSI bus. The data transfer system releases the first SCSI bus before transferring data over the second SCSI bus. Thus, the first SCSI bus and the second SCSI bus are not reserved at the same time for the data transfer. The data transfer system eliminates deadlock because the simultaneous use of both SCSI buses is not required.

20 Claims, 5 Drawing Sheets

DATA TRANSFER BETWEEN SMALL COMPUTER SYSTEM INTERFACE SYSTEMS

FIELD OF THE INVENTION

The invention is related to the field of data transfer, and in particular, to transferring data between computers and data storage devices that are connected by a Small Computer System Interface (SCSI, pronounced "scuzzy").

PROBLEM

American National Standards Institute (ANSI) standard X3T9 specifies the SCSI bus interface. A SCSI bus is typically used between a host computer and associated data storage devices. In a typical example of SCSI operation, the host computer issues a write command to a disk drive over the SCSI bus. The disk drive asserts a SCSI bus line that reserves the SCSI bus for a data transfer. The disk drive then requests data from the host computer, and the host computer transfers the data to the disk drive over the reserved SCSI bus. The length of the SCSI bus is restricted to a few meters due to electrical limitations.

Fault tolerance is important in many computer systems. For example, banks use redundant computer systems called clusters to provide access to financial data if one computer system fails. Physical separation between redundant computer systems improves fault tolerance. If two computer systems are in different buildings that are one kilometer apart, then a fire in one building would not affect the computer system in the other building. The two computer systems may each have a SCSI bus to access their respective data storage devices, but the SCSI bus lengths are much too short to couple the two computer systems.

FIG. 1 depicts a system 100 that is similar to that described above. Shown is site 101 and site 102. Site 101 contains host computer 111, SCSI bus 121, disk drive 131, and converter 141. Site 102 contains host computer 112, SCSI bus 122, disk drive 132, and converter 142. At each site, the SCSI bus interconnects the respective host computer, disk drive, and converter. The converter 141 at site 101 is connected to the converter 142 at site 102 by a Fiber Channel link 143. The converters 141 and 142 convert between the SCSI format and the Fiber Channel format.

In operation, the host computer 111 at site 101 reads and writes data to the disk drive 131 over the SCSI bus 121. The host computer 111 at site 101 also reads and writes data to the disk drive 132 at site 102. Data transfers between sites 101 and 102 occur through converters 141 and 142 over Fiber Channel link 143. For example, the host computer 111 transfers data to the disk drive 132 on a data path comprising the SCSI bus 121, converter 141, Fiber Channel link 143, converter 142, and SCSI bus 122. The host computer 112 reads and writes data in a similar fashion.

A serious deadlock problem occurs in the system 100 when the host computer 111 attempts to write data to the disk drive 132 at the same time that the host computer 112 attempts to write data to the disk drive 131. The host computer 111 issues a write command to the disk drive 132, and the disk drive 132 later reserves the SCSI bus 122 for the data transfer. At the same time, the host computer 112 issues a write command to the disk drive 131, and the disk drive 131 later attempts to reserve the SCSI bus 121 for the other data transfer. Therefore, each SCSI bus is reserved for a different data transfer, yet both SCSI busses are simultaneously required for each data transfer.

The deadlock occurs since neither data transfer can take place. The host computer 111 cannot complete a data transfer on the SCSI bus 121 because it is reserved by the disk drive 131 for the data transfer from the host computer 112. Likewise, the host computer 112 cannot transfer data on the SCSI bus 122 because it is reserved by the disk drive 132 for the data transfer from the host computer 111. System 100 would be improved by a solution to the deadlock problem. Such a solution would improve the ability of entities such as banks, hospitals, and airports to physically separate computer systems for improved fault tolerance.

SOLUTION

The invention overcomes the above problems by providing a system that eliminates the deadlock problem described above. The solution improves the ability of entities such as banks, hospitals, and airports to physically separate computer systems to improve fault tolerance. The invention includes a method for operating a data transfer system to transfer data between a computer and a data storage device. The data transfer system receives the data from the computer over a first SCSI bus and then releases the first SCSI bus. The data transfer system transfers the data within the data transfer system over a non-SCSI connection. The data transfer system then transfers the data to the data storage device over a second SCSI bus after releasing the first SCSI bus.

In a distinct advance in the art, the data transfer system releases the first SCSI bus before transferring data over the second SCSI bus. Thus, the first SCSI bus and the second SCSI bus are not reserved at the same time for the data transfer. The data transfer system eliminates deadlock because the simultaneous use of both SCSI buses is not required. The data transfer system transfers the data without waiting to reserve both SCSI busses at the same time.

In one embodiment, the computer transfers a first write command to a first converter over a first SCSI bus. The first converter reserves the first SCSI bus in response to the first write command. The first converter transfers a first data request to the computer, and the computer transfers the data to the first converter in response to the first data request. The first converter releases the first SCSI bus after the data transfer and stores the data. The first converter transfers the data to a second converter over a Fiber Channel and the second converter stores the data. After the first SCSI bus is released, the second converter transfers a second write command to the disk drive over a second SCSI bus. The disk drive reserves the second SCSI bus in response to the second write command. The disk drive transfers a second data request to the second converter, and the second converter transfers the data to the disk drive in response to the second data request. The disk drive stores the data and releases the second SCSI bus after the second data transfer.

DETAILED DESCRIPTION

Figure 2:
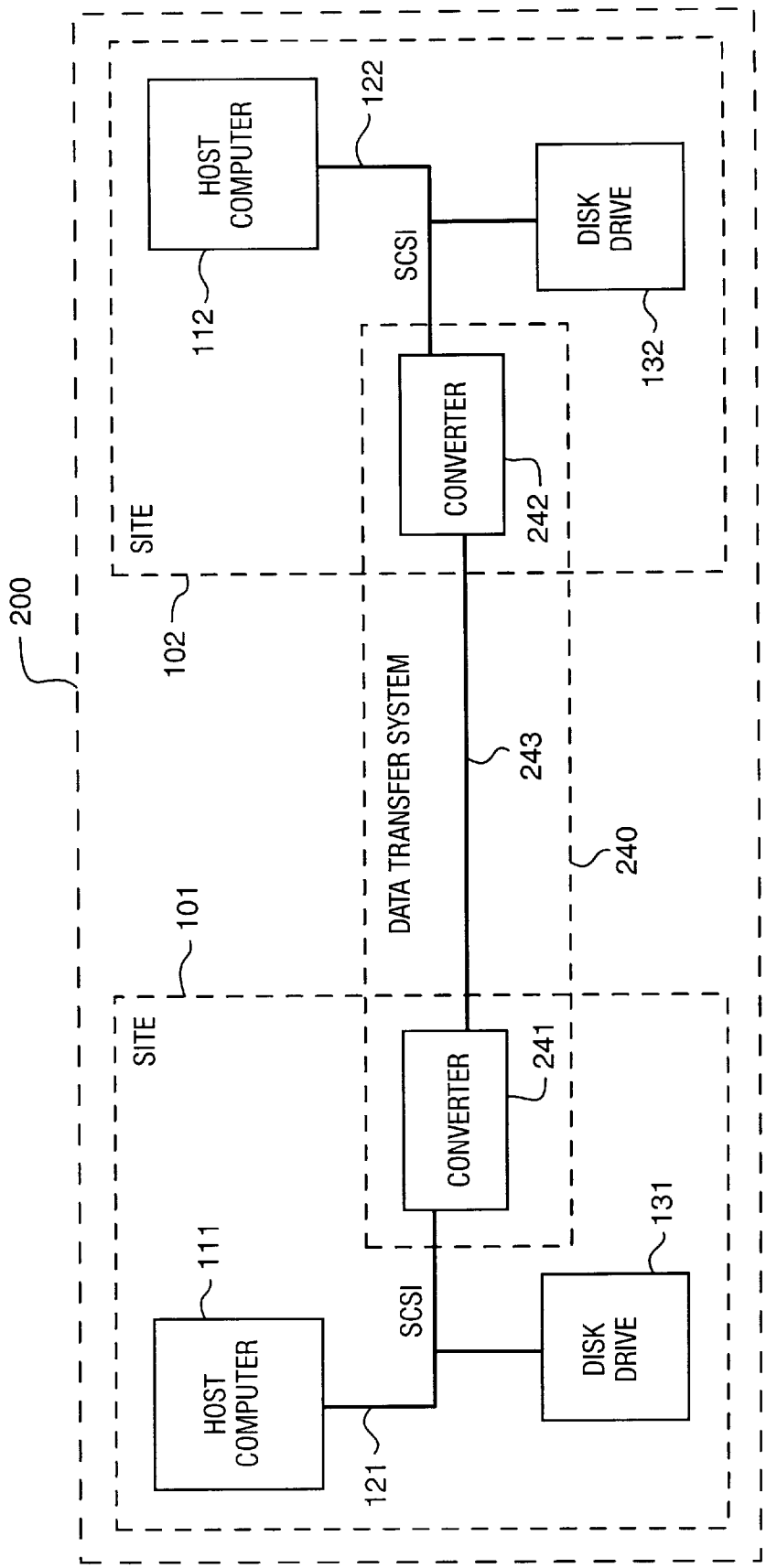
FIG. 2 is a block diagram of a system configuration in an embodiment of the invention.
Figure 3:
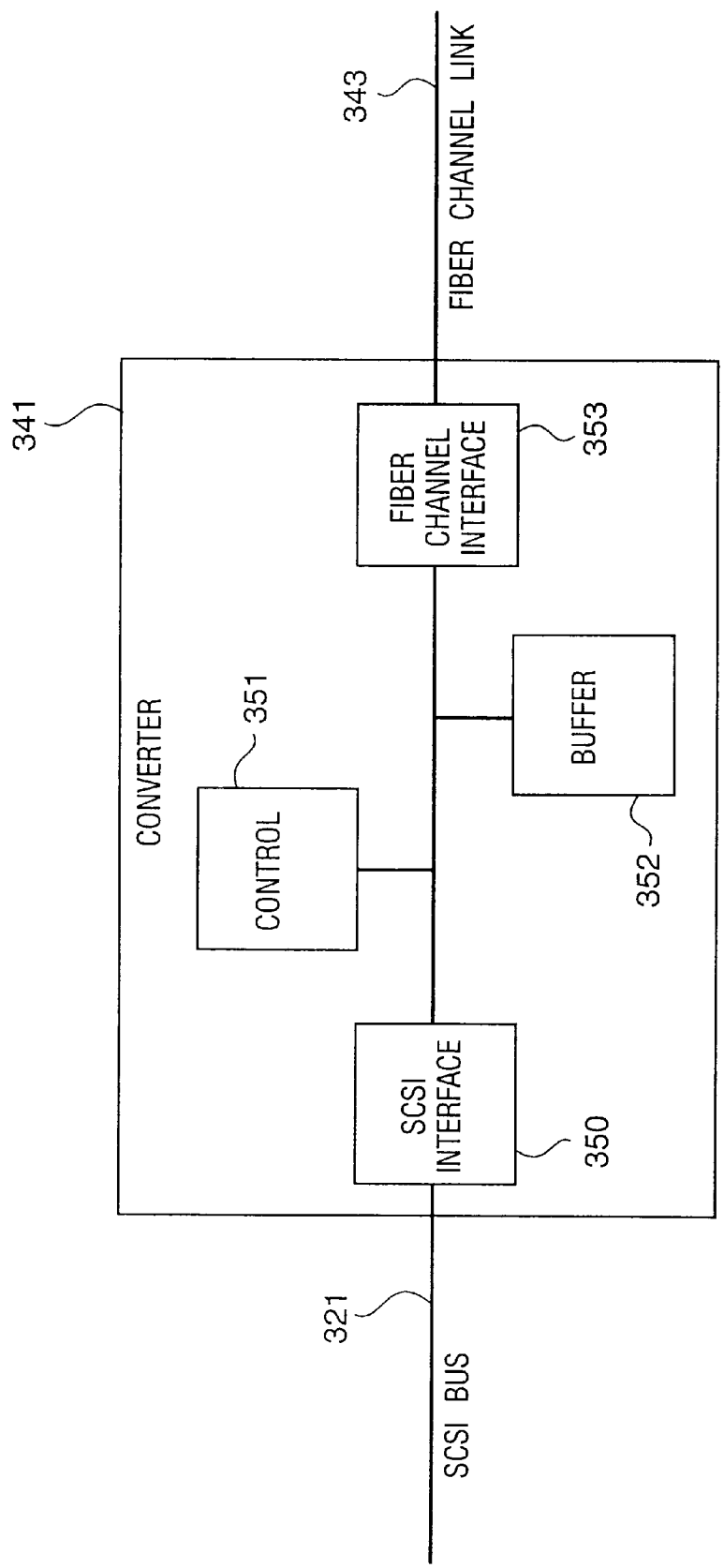
FIG. 3 is a block diagram of a converter in an embodiment of the invention.

System Configuration—FIGS. 2–3

Figure 1:
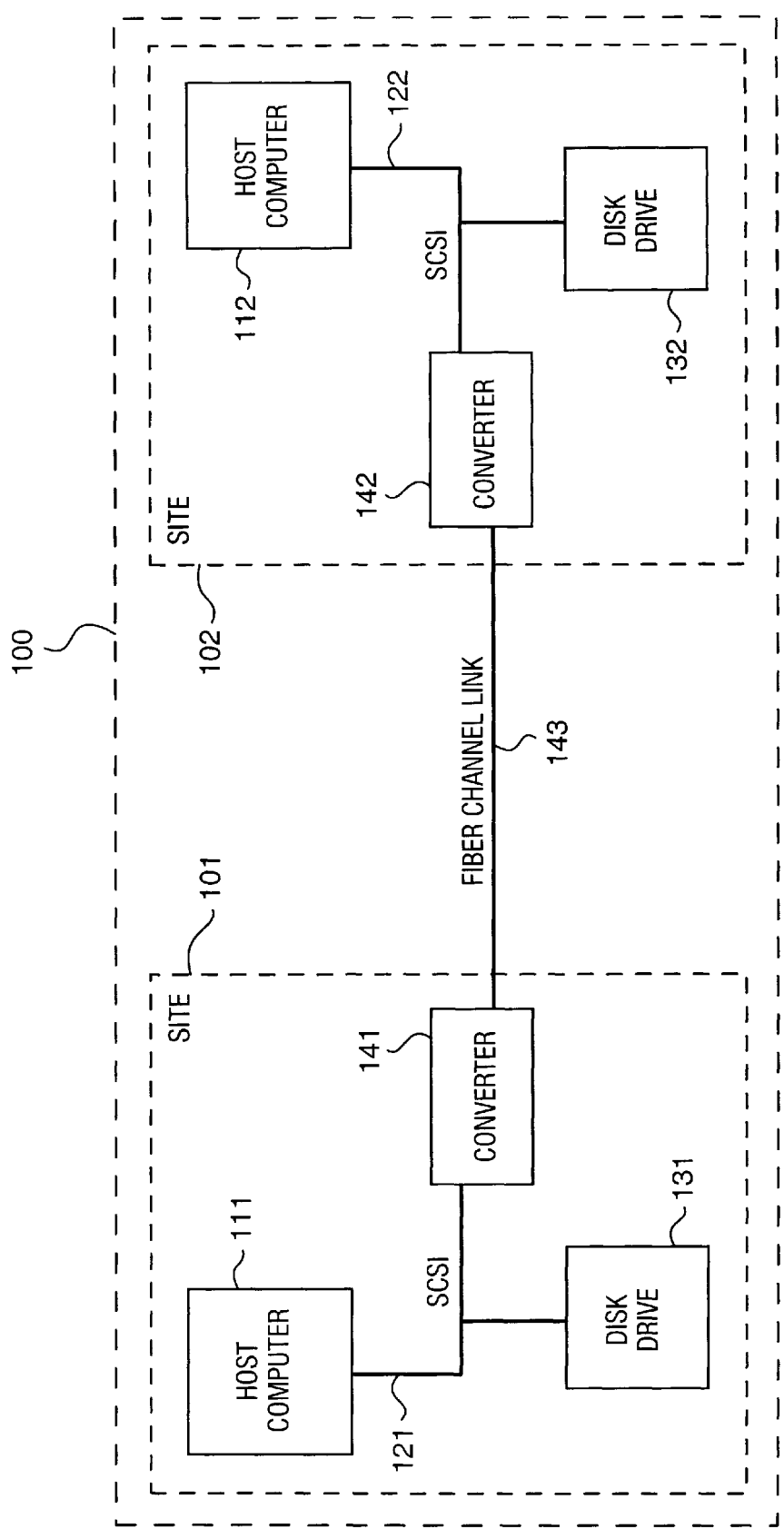
FIG. 1 is a block diagram of a prior data transfer system.

FIG. 2 depicts a system 200 that includes sites 101 and 102. The system 200 is similar to the system 100 described above with reference to FIG. 1, except that the system 200 has been adapted to include a data transfer system 240. Site 101 contains host computer 111, SCSI bus 121, disk drive 131, and converter 241. Site 102 contains host computer 112, SCSI bus 122, disk drive 132, and converter 242. At each site, the SCSI bus interconnects the respective host computer, disk drive, and converter. The converter 241 at site 101 is connected to the converter 242 at site 102 by a data link 243. The converters 241–242 and the data link 243 comprise the data transfer system 240.

The host computers 111 and 112 could be conventional personal computers that are configured with a SCSI interface, such as the model 2940 SCSI Host Adapter supplied by Adaptec of Milipitas, Calif. The disk drives 131 and 132 represent any SCSI data storage devices and could be SCSI drives supplied by Seagate of Scotts Valley, Calif. The SCSI buses 121 and 122 could be conventional SCSI cables.

The data transfer system 240 converts between the SCSI format and another format. The converters 241 and 242 make the conversion to the other format and the data link 243 carries the other format. The data link 243 does not use the SCSI format and must support data transfers over distances much greater than the distance supported by a SCSI bus. In some embodiments, the data link 243 is a Fiber Channel link that is at least one kilometer in length. The Fiber Channel format is specified by the American National Standards Institute (ANSI) committee X3T11 for data communications between computers. Other examples of the data link 243 include ethernet, internet, or telephone lines.

The data transfer system 240 eliminates deadlock by managing data transfers between the host computer at one site and the data storage device at the other site. For example, the host computer 111 at site 101 may attempt to write data to the disk drive 132 at site 102. The data transfer system 240 receives the data from the host computer 111 over the SCSI bus 121. The data transfer system 240 transfers the data over the data link 243. The data transfer system 240 transfers the data to the disk drive 132 over the SCSI bus 122. Advantageously, The data transfer system 240 releases the SCSI bus 121 before transferring the data over the SCSI bus 122. The data transfer system 240 eliminates the deadlock problem because it does not reserve both SCSI busses 121 and 122 at the same time.

FIG. 3 depicts a converter 341 that represents a version of the converters 241 and 242 of FIG. 2. Those skilled in the art will appreciate other versions of the converter that also support the invention. The converter 341 is comprised of SCSI interface 350, control 351, buffer 352, and Fiber Channel interface 353. A conventional bus interconnects the elements 350–353. The SCSI interface 350 is connected to a SCSI bus 321. The Fiber Channel interface 353 is connected to a Fiber Channel link 343. The SCSI interface 350 and the Fiber Channel Interface 353 are conventional components. One example of a SCSI/Fiber Channel converter that could be adapted to include the control 351 and the buffer 352 is the model AEC-7312 supplied by Adaptec of Milpitas, Calif.

The buffer 352 can be conventional, such as registers or Random Access Memory (RAM). The size of the buffer 352 can be set based on the data transfer requirements. A large buffer could be required for large data transfers, or a smaller buffer could be used and the data transfer could be broken down into smaller sub-transfers.

The control 351 is a conventional processor that performs logical operations to control data transfers through the converter 341. The logical operations entail: 1) the reception of data, 2) the storage of the data in the buffer 352, and 3) the transfer of the data. For a data transfer from the SCSI bus 321 to the Fiber Channel link 343, the control 351 emulates the SCSI interface operation of a SCSI disk drive receiving and storing data from a host computer. For a data transfer from the Fiber Channel link 343 to the SCSI bus 321, the control 351 emulates the SCSI interface operation of a host computer transferring the data to a SCSI disk drive.

Figure 4:
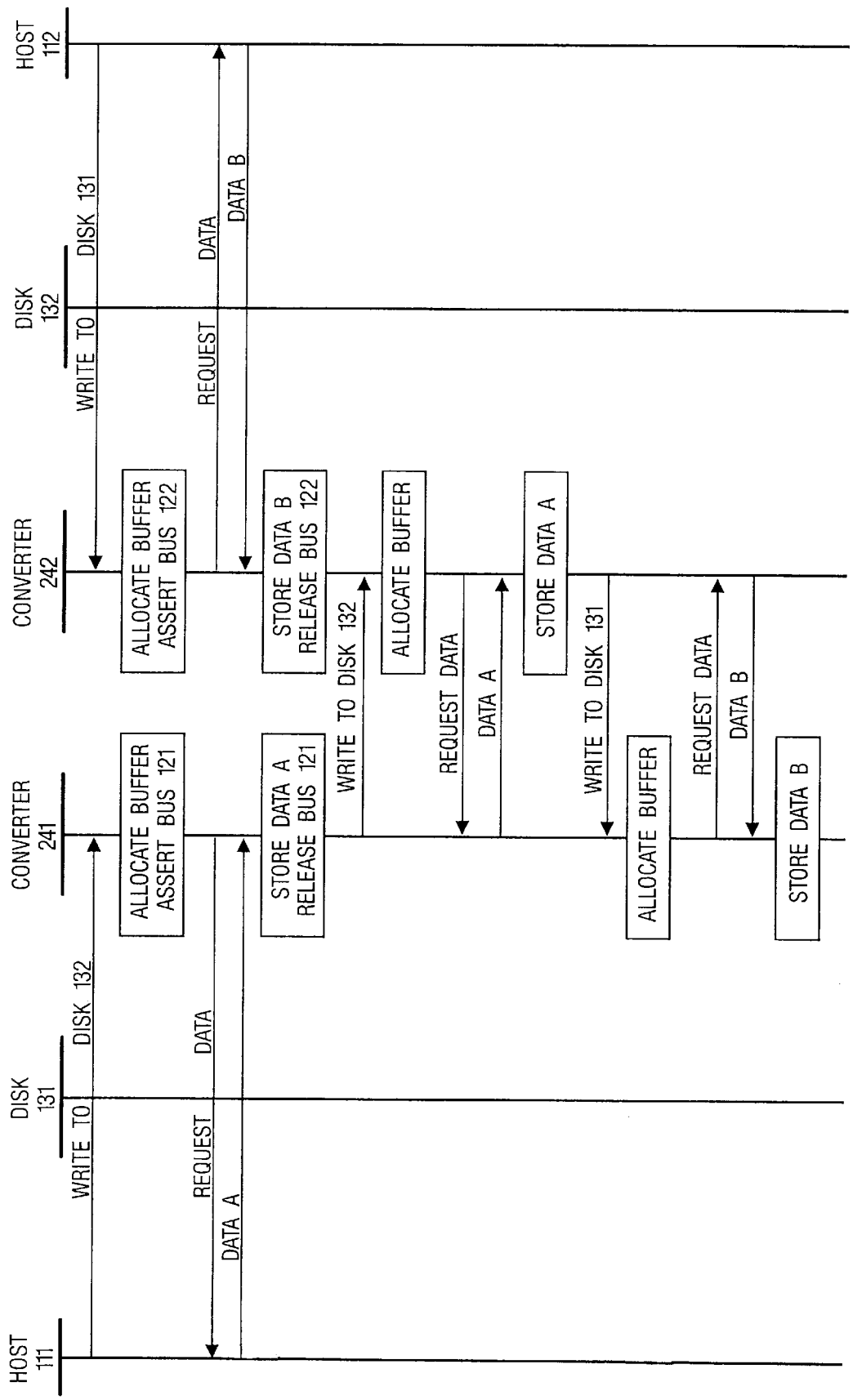
FIGS. 4–5 are logic diagrams of system operation in an embodiment of the invention.
Figure 5:
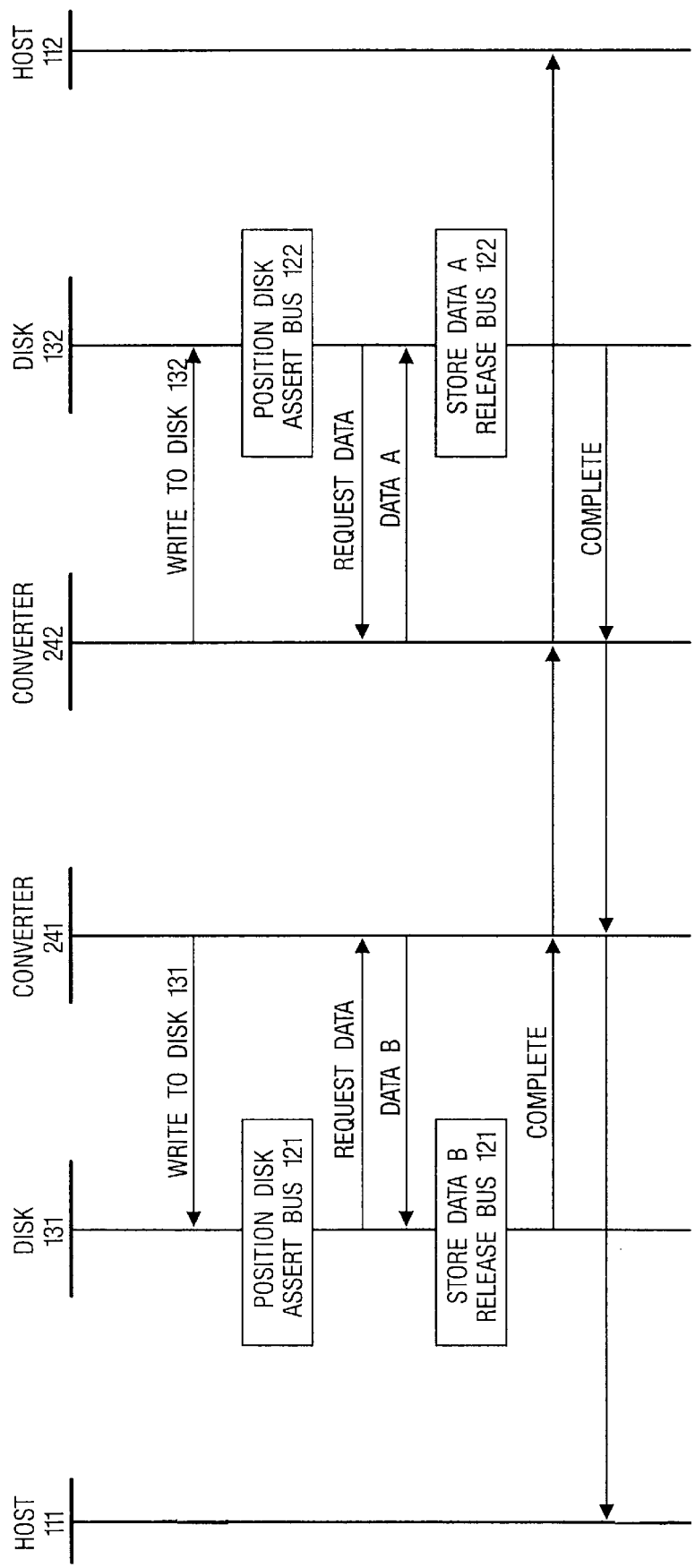

System Operation—FIGS. 4–5

FIGS. 4 and 5 are logic diagrams that illustrate the operation of the system 200 of FIG. 2. The operational sequence begins on FIG.4 when the host computer 111 issues a SCSI command to the converter 241 for a write to the disk drive 132. The host computer 112 then issues a SCSI command to the converter 242 for a write to the disk drive 131. Note that such an event in the prior system 100 would cause deadlock during the data transfer phase.

The converter 241 allocates buffer space and asserts the SCSI bus 121. The converter 241 sends a SCSI data request to the host computer 111. The host computer 111 transfers the data "A" to the converter 241 over the SCSI bus 121. The converter 241 stores the data "A" in its buffer and releases the SCSI bus 121. During this same period, the converter 242 allocates buffer space and asserts the SCSI bus 122. The converter 242 sends a SCSI data request to the host computer 112. The host computer 112 transfers the data "B" to the converter 242 over the SCSI bus 122. The converter 242 stores the data "B" in its buffer and releases the SCSI bus 122.

If the converters 241 and 242 use a Fiber Channel link, then the converters 241 and 242 exchange commands using the Fiber Channel Protocol for SCSI (FCP). The converter 241 sends a command to the converter 242 to write to the disk 132. The converter 242 allocates buffer space and requests the data from the converter 241. The converter 241 transfers the data "A" to the converter 242, and the converter 242 stores the data "A" in its buffer. The converter 242 sends a command to the converter 241 to write to the disk 131. The converter 241 allocates buffer space and requests the data from the converter 242. The converter 242 transfers the data "B" to the converter 241, and the converter 241 stores the data "B" in its buffer. Therefore, the converters 241 and 242 exchange the data "A" and the data "B".

The operational sequences continues on FIG. 5. The converter 241 sends a SCSI command to the disk drive 131 to write data to its disk. The disk drive 131 positions its disk and asserts the SCSI bus 121. The disk drive 131 sends a SCSI data request to the converter 241, and the converter 241 transfers the data "B" to the disk drive 131 over the SCSI bus 121. The disk drive 131 stores the data "B" and releases the bus 121. The disk drive 131 sends a SCSI command completed message to the converter 241. The converter 241 forwards the message to the converter 242, and the converter 242 forwards the message to the host computer 112.

The converter 242 sends a SCSI command to the disk drive 132 to write data to its disk. The disk drive 132 positions its disk and asserts the SCSI bus 122. The disk drive 132 sends a SCSI data request to the converter 242, and the converter 242 transfers the data "A" to the disk drive 132 over the SCSI bus 122. The disk drive 132 stores the data "A" and releases the bus 122. The disk drive 132 sends a SCSI command completed message to the converter 242. The converter 242 forwards the message to the converter 241, and the converter 241 forwards the message to the host computer 111. The data transfer is complete.

Variations from the above operation are contemplated by the invention. For example, the host computer 111 could use the SCSI bus 121, the converter 241, and the data link 243 to transfer the data "A" directly to the converter 242 before releasing the SCSI bus 121. Likewise, the host computer 112 could use the SCSI bus 122, the converter 242, and the data link 243 to transfer the data "B" directly to the converter 241 before releasing the SCSI bus 122. The invention is described in terms of data transfers from the host computers 111–112 to the disk drives 131–132, but those skilled in the art appreciate that the invention could be used for data transfers from the disk drives 131–132 to the host computers 111–112.

Conclusion

The invention provides a system that eliminates deadlock during data transfers between two remote SCSI systems. The invention improves the ability of entities such as banks, hospitals, and airports to physically separate computer systems for improved fault tolerance. The invention includes a data transfer system to transfer data between a computer and a disk drive. The data transfer system receives the data from the computer over a first SCSI bus and then releases the first SCSI bus. The data transfer system then transfers the data to the disk drive over a second SCSI bus after releasing the first SCSI bus.

In a distinct advance in the art, the data transfer system releases the first SCSI bus before transferring data over the second SCSI bus. Thus, the first SCSI bus and the second SCSI bus are not reserved at the same time for the data transfer. The data transfer system eliminates deadlock because the simultaneous use of both SCSI buses is not required. The data transfer system transfers the data without waiting to reserve both SCSI busses at the same time.

Those skilled in the art can appreciate variations of the above-described embodiments that fall within the scope of the invention. Therefore, the invention is not limited to the specific embodiments discussed above, but only by the following claims and their equivalents.

What is claimed is:

1. A method for transferring data between a computer and a data storage device over a first Small Computer System Interface (SCSI) bus and a second SCSI bus, the method comprising:
   (a) receiving the data from the computer into a data transfer system over the first SCSI bus;
   (b) releasing the first SCSI bus;
   (c) transferring the data within the data transfer system over a connection that does not use a SCSI format; and
   (d) transferring the data from the data transfer system to the data storage device over the second SCSI bus after step (b).

2. The method of claim 1 further comprising sending a SCSI write command from the host computer to the data transfer system before step (a).

3. The method of claim 1 further comprising the data transfer system asserting the first SCSI bus before step (a).

4. The method of claim 1 further comprising storing the data in a buffer in the data transfer system between steps (a) and (d).

5. The method of claim 1 further comprising sending a SCSI write command from the data transfer system to the data storage device before step (d).

6. The method of claim 1 further comprising the data storage device asserting the second SCSI bus before step (d).

7. The method of claim 1 further comprising the data storage device releasing the second SCSI bus after step (d).

8. The method of claim 1 further comprising transferring a SCSI command complete message from the data storage device to the host computer through the data transfer system after step (d).

9. The method of claim 1 further comprising
   (e) receiving other data from another computer into the data transfer system over the second SCSI bus;
   (f) releasing the second SCSI bus before step (d);
   (g) transferring the other data within the data transfer system; and
   (h) transferring the other data from the data transfer system to another data storage device over the first SCSI bus after steps (b) and (f).

10. The method of claim 1 wherein the data storage device is a disk drive.

11. The method of claim 1 wherein step (c) comprises transferring the data over a Fiber Channel link.

12. The method of claim 1 wherein step (c) comprises transferring the data over an ethernet link.

13. The method of claim 1 wherein step (c) comprises transferring the data over an internet link.

14. The method of claim 1 wherein step (c) comprises transferring the data over a telephone link.

15. A method for transferring data between a computer and a disk drive comprising:
   (a) transferring a first write command from the computer to a first converter over a first Small Computer System Interface (SCSI) bus;
   (b) in the first converter, reserving the first SCSI interface bus in response to the first write command;
   (c) transferring a first data request from the first converter to the computer in response to reserving the first SCSI bus;
   (d) transferring the data from the computer to the first converter over the first SCSI bus in response to the first data request;
   (e) in the first converter, storing the data and releasing the SCSI bus after the data is transferred from the computer;
   (f) transferring the data from the first converter to a second converter over a data link and storing the data in the second converter;
   (g) transferring a second write command from the second converter to the disk drive over a second SCSI bus after the first converter releases the first SCSI bus;
   (h) in the disk drive, reserving the second SCSI bus in response to the second write command;
   (i) transferring a second data request from the disk drive to the second converter in response to reserving the second SCSI bus;
   (j) transferring the data from the second converter to the disk drive over the second SCSI bus in response to the second data request; and
   (k) in the disk drive, storing the data and releasing the second SCSI bus after the data is transferred from the second converter.

16. The method of claim 15 wherein the data link is a Fiber Channel link.

17. A system for transferring data using a Small Computer System Interface (SCSI), the system comprising:
   a data transfer system;
   a first computer;
   a first disk drive;
   a first SCSI bus interconnecting the data transfer system, the first computer, and the first disk drive;
   a second computer;
   a second disk drive;

a second SCSI bus interconnecting the data transfer system, the second computer, and the second disk drive;

wherein the data transfer system is operational to transfer data between the first computer and the second disk drive without reserving the first SCSI bus and the second SCSI bus at the same time, and operational to transfer data between the second computer and the first disk drive without reserving the first SCSI bus and the second SCSI bus at the same time.

18. The system of claim 17 wherein the data transfer system is comprised of a first SCSI/Fiber Channel converter and a second SCSI/Fiber Channel converter connected by a Fiber Channel link.

19. A Small Computer System Interface (SCSI) converter for transferring data, the converter comprising:

a SCSI interface operational for connection to a SCSI bus;

a buffer operational to store the data;

a data interface operational for connection to a data link;

a control processor operational to direct the converter;

a bus interconnecting the SCSI interface, the buffer, the data interface, and the control processor; and wherein the control processor is operational to direct the converter to receive a SCSI write command from the SCSI bus, to assert the SCSI bus, to transmit a SCSI data request command over the SCSI bus, to receive the data over the SCSI bus, to store the data in the buffer, to release the SCSI bus, and to transfer the data from the buffer to the data link after releasing the SCSI bus.

20. The converter of claim 19 wherein the data interface is operational for connection to a Fiber Channel link.

* * * * *